2,849,407
ADSORBENT REACTIVATION PROCESS

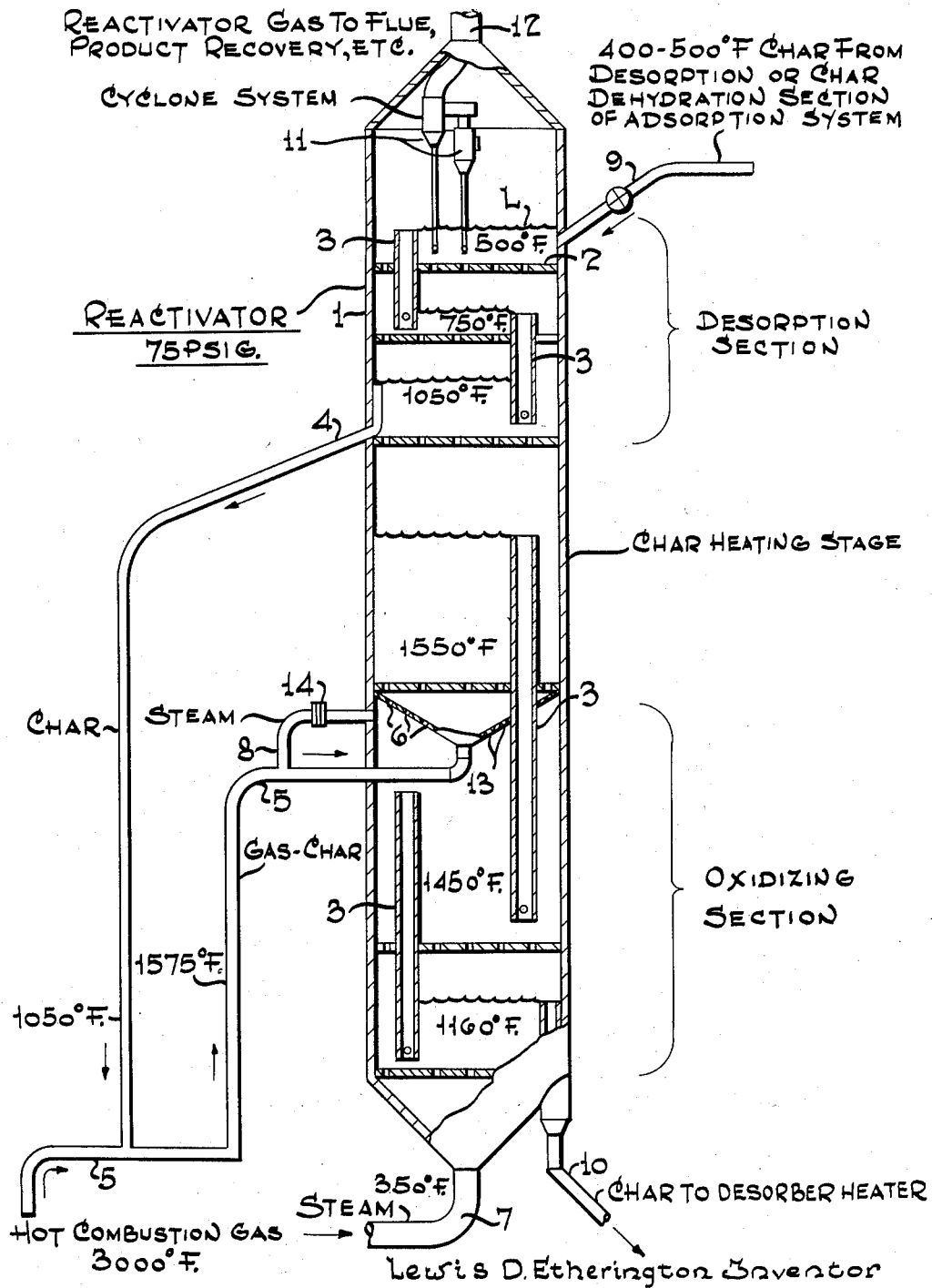

Lewis D. Etherington, Cranford, N. J., assignor to Esso Research and Engineering Company, a corporation of Delaware Application August 28, 1951, Serial No. 244,026

5 Claims. (Cl. 252—418)

This invention relates to an improved process for the reactivation of spent solid granular adsorbent employed in the separation of a mixture of gaseous or liquid components by means of an adsorption-desorption system. The invention is particularly concerned with the reactivation of spent adsorbent by means of heat treatment at definite temperature levels combined with oxidation of adsorbent contaminants with concentrated steam. More specifically the invention is concerned with an activated carbon reactivation process wherein the reactivation heat is supplied directly by means of hot combustion gas while controlled oxidation of the contaminants on the carbon is carried out at high temperature by means of concentrated steam.

The process of separating components of mixtures, both liquid and gaseous, by means of solid adsorbents has been well described. It is known that components of a mixture having varying degrees of adsorbability may be separated by contacting the mixture with a solid adsorbent whereby the more adsorbable component is adsorbed by the solid in preference to the less adsorbable component. The solid is then treated to recover the more adsorbable component therefrom in a process called desorption. The latter is usually accomplished by heat and/or stripping with steam or inert gas, or less usually by means of washing with a solvent for the adsorbed component.

It is well known that hydrocarbon mixtures, particularly gaseous mixtures, are separated into their components by treating them in intimate contact with solid adsorbents particularly activated carbon, silica gel, etc. In general it may be said that the activated carbons separate the hydrocarbons roughly by molecular weight, the higher molecular weight components of the hydrocarbon mixture being preferentially adsorbed by the carbon. On the other hand silica gel usually displays an affinity for the olefinic or more unsaturated hydrocarbons in preference to the less saturated or paraffinic type.

Recently a continuous process has been developed whereby hydrocarbon gases are separated into their components by countercurrently treating the gases with a finely-divided granular solid such as finely-divided activated carbon. In this process the granular solid containing adsorbed gases are generally heated and stripped with inert gases such as $N_2$, steam, etc. to recover the adsorbed fractions. This heating is accomplished usually by indirect heat exchange, the heating fluid being condensing Dowtherm vapors, combustion gases or the like. The bulk of the desorbed solid is cooled and returned to the adsorption zone to repeat the cycle. In the adsorption-desorption process it is necessary to continuously reactivate a small part of the circulating solid adsorbent to remove therefrom particularly highly adsorbable and physically-bound high molecular weight components, including polymeric and tar-like materials, which render the solid adsorbent inactive for the separation desired. This reactivation is accomplished by passing a stream of the circulating solid to a reactivation zone where it is heated to a higher temperature, contacted with oxidizing gases such as steam and carbon dioxide, and preferably subjected to higher stripping gas/adsorbent char ratio than prevailing in the desorption zone of the adsorber-desorber system. For example, in the adsorptive separation of refinery $C_1$, $C_2$ and $C_3$ fractions with activated charcoal, small amounts of $C_4$ and heavier hydrocarbons are present in the feed gas. The desorber is designed for essentially complete desorption of the $C_3$ and lighter products, but it is not economical to provide conditions in the main desorber for complete desorption of the relatively small amount of $C_4+$ hydrocarbon from the total adsorber char stream. Therefore, the $C_4+$ material including non-polymer, polymer and tarry constituents, defined as deactivants, will build up on the circulating adsorber char and reduce its activity for the $C_1$-$C_2$-$C_3$ separations.

Only a small portion of the circulating adsorber char stream is treated in the reactivator. Thus, this small reactivator char stream may be subjected to higher temperatures and a higher ratio of stripping gas/char than provided in the main desorber, without involving excessive expense. It is desired to heat the reactivator char gradually in the presence of stripping gas. By this means, desorbable deactivants are removed from the char at minimum temperatures and therefore with minimum cracking and further polymerization of these materials. It is impossible or impractical to physically remove the heavier deactivants. Rather, it is preferred to remove these deactivants by oxidation with suitable gases such as steam or carbon dioxide, which selectively oxidize the heavy deactivants and do not burn excessive amounts of the adsorbent char, at the higher reactivator char temperatures provided. Only a relatively small proportion of the total circulating solids is sent to the reactivation zone per adsorption-desorption cycle. Usually about 1 to 5% by weight of the solid is thus removed. Periodic or continuous regeneration of the solid to this extent is usually sufficient to maintain the solid at the equilibrium activity level desired. However, greater or lesser amounts are reactivated, depending upon the state of degradation of the char, upon the char contaminants present in the adsorber feed gas, and upon the rate of polymerization of feed constituents within the adsorber-desorber system.

In the reactivation of spent chars (deactivated carbons) which have been employed in the separation of gaseous hydrocarbon mixtures and have become deactivated by adsorption thereon of highly adsorbable contaminants, it has been found that high concentrations of steam are required for oxidizing heavy deactivants in order to minimize reactivator size and costs. Furthermore, the steam treatment must be carried out at high temperatures in the range of 1100° F.–1600° F. To supply the necessary high temperatures required by superheated steam alone would require excessive amounts of steam and expensive heat transfer equipment for superheating the steam. Indirect heating of the adsorbent with hot combustion gas also involves the use of expensive alloy steel heat exchange equipment. Adsorbent heating by direct contact with hot combustion gas can be seen to be a preferred method since the need for heat exchange surface is eliminated. In general, however, neither the quantity nor concentration of steam normally present in the hot combustion gas required for the desired adsorbent heating would be adequate for oxidizing the heavy non-desorbable char deactivants. Adding additional extraneous steam with the hot combustion gas feed to the reactivator would require excessive steam in order to bring the steam concentration to the desired level for good oxidation rates. The excessive steam would be costly per se and would lower the heat efficiency and expand the size of the reactivator.

The present invention accomplishes direct contact of deactivated char with hot combustion gas for heating purposes, and with highly concentrated steam for purposes of oxidation and burning of impurities with maximum efficiency and minimum expense.

The invention will be more fully understood by reference to the accompanying figure which is a diagrammatical, cross-sectional sketch of one type of apparatus employed to carry out the reactivation. Referring to the drawing, numeral 1 represents a brick-lined carbon steel reactivator vessel. The vessel is staged by means of either perforated plates, bubble-cap plates, or baffle plates 2. Other means of staging such as packing may be used. The plates permit build-up of char to a level L. The plates are also fitted with downcomers 3 allowing the passage of char from one stage to the next lower stage. The reactivation zone is divided into an upper desorption section, a middle heating section which may comprise only a heating gas introduction stage, and a lower oxidizing section. Provision is made for removal of char from the lowermost desorption stage via pipe 4. The removed char is contacted with hot combustion gas in pipe 5 and returned to the heating stage in the middle of the reactivator via cone 6. The char overflows the plate immediately above cone 6 and proceeds down the tower via the downcomer to the lower oxidizing section. Pure steam enters the bottom of the reactivator via pipe 7.

Combustion gases combined with steam and reaction gas from the oxidizing section travel up the tower from the heating stage through the desorption section and strip the desorbable deactivants from the char. Combustion gases do not enter the oxidizing section except for the relatively small amount entrained by the char overflowing from the heating stage. Steam passes upwardly through the oxidizing section countercurrent to the downflowing char and oxidizes the impurities on the char which were not removed from the char in the heating and desorption sections above. The hot steam from the oxidizing section passes up into the heating stage and desorption section together with the combustion gases and assists in their action in these sections. The steam enters the heating and desorption sections either through perforations in the cone 6 or by introduction with the heated char and combustion gases in line 5. To accomplish this, steam is withdrawn from the tower at a point below the cone 6 via pipe 8 and is introduced into line 5 for return to the tower 1 where it ascends together with the combustion gas. A restriction orifice or damper 14 in line 8 provides for smoother tower operation. Deactivated char enters the uppermost stage of the reactivator desorption section via line 9 while the hot reactivated char leaves the system via line 10 and is sent preferably to the desorber-heater of the adsorption-desorption system not shown. The reactivator gas passes through cyclones 11 in the uppermost section of the reactivator and after removal of fines therefrom is withdrawn via pipe 12 to the flue or for recovery, etc.

Deactivated char at about 400°–500° F. from an adsorption unit not shown is fed to the top of the staged reactivator tower. In the upper stages of the reactivator shown, namely, in the desorption section, the char is heated countercurrently with hot gases comprising a mixture of combustion gases and steam, passing upwardly from below. Desorbable deactivants, for example, $C_5$, $C_6$, and $C_7$ hydrocarbons, are removed without excessive polymerization or cracking in the upper low temperature desorption stages of the reactivator. The desorbed char then descends into the heating stage of the reactivator. The char heating medium is hot combustion gas at approximately 3000° F. obtained by burning fuel gas, natural gas, for example, with air in a burner system not shown in the drawing. The gas is fed into the reactivator at one or more heating stages above the oxidizing section of the reactivator. The initial direct contact of the char and combustion gas is preferably accomplished by removing the char at about 1050° F. from the lowest desorption stage of the reactivator, which is the third stage in the drawing, and contacting the char with a combustion gas in lift line 5 external to the reactivator. The resulting gas-char mixture temperature in line 5 is approximately 1500°–1575° F. The combustion gas lifts the char back to the reactivator at the heating stage which is the fourth stage in the drawing.

Steam and carbon dioxide present in the combustion gas in contact with the char in line 5, in cone 6, and in the heating stage oxidizing non-desorbable char deactivants such as tars and heavy polymers. Due to dilution of oxidizing constituents with inert gases, the oxidation rate is relatively low in these stages. Therefore, in the next lower stage, namely, the fifth stage or first oxidizing stage, the char is contacted with essentially a full atmosphere of steam at approximately 1450° F. to give a higher oxidation reaction rate and to minimize char holding time or reactivator volume. The steam is combined with the combustion gas in the upper stages as previously related. The bottom stage or sixth stage of the reactivator serves chiefly to preheat the reactivator steam which enters the reactivator at approximately 350° F. via line 7. This steam cools the exit char to approximately 1160° F. However, some oxidation of deactivants occurs at this temperature in the bottom stage.

The char, reactivated to the desired level by control of reactivation temperatures, residence time, steam, etc., is removed from the reactivator via line 10 and returned to the adsorption system, preferably to the desorber-heater or to the bottom desorber stage where its high temperature heat content is efficiently utilized to preheat the stripping steam and to give more effective desorption. Alternately, the heat content of this char may be utilized to boil water fed to the bottom stage of the reactivator and thereby provide at least a portion of the reactivator process steam, for example, at about 500° F. This water boiling stage may represent an additional stage over those shown in the diagram. For example, the steaming section may comprise in descending order an oxidizing stage, a steam preheat stage, and the boiling stage. The steam preheat stage gives the maximum top oxidizing stage temperature for a given fuel gas rate. An added advantage of separating the steaming and the heating sections of the reactivator is that the steam strips all the combustion gas from the exit char and prevents contamination of adsorber products with this gas.

The passage of the char from the heating stage into the oxidizing section may be via a downcomer which is a reactivator wall section isolated by a vertical plate from the contacting char and gas in the heating stage. In this case, the cone 6 would extend only to the vertical plate portion of the downcomer. Also the heating stage downcomer may represent a pipe section which pierces the inclined wall of cone 6 as illustrated in the drawing. In this case, the mouth of cone 6 encompasses the reactivation circumference. This invention is not concerned with the manner in which the steam contacts the char. Possible alternatives in this regard are to place holes 13 in the walls of the cone to permit passage of steam therethrough or to route the steam from the top of the oxidizing section beneath the cone out of tower 1 via line 8 and into line 5 from which it is returned to the bottom of the conical well 6. Steam line 8 is equipped with a restriction orifice 14 to cause pressure drop and to prevent surges in the line.

Contact between the hot combustion gas, initially at about 3000° F., and the char in the heating stage may be accomplished directly in the reactivator vessel itself; preferably, however, the reactivator char and combustion gas are first contacted externally to the reactivator to minimize the maximum reactivator temperature and therefore to minimize damaging effects such as thermal strains on the reactivator and to avoid the necessity of insulating this vessel against 3000° F. combustion gas. The combustion gas is obtained preferably by burning natural gas with air in amounts slightly below that required for complete combustion. Thus, any free oxygen in the combustion gas will react preferentially and essentially completely with carbon monoxide while the combustion gas and char are coming to temperature equilibrium in line 5. The action of free oxygen in excess of that required for complete fuel gas combustion is detrimental to the char, in particular at the higher reactivation system temperatures. The combustion temperature realized on burning natural gas with the maximum allowable air (to avoid excess molecular oxygen as just related) is about 3000° F. In the system concerned wherein the char is employed in the separation of $C_1$ to $C_3$ and heavier hydrocarbons, wherein separate $C_1$, $C_2$, and $C_3$-enriched streams are separated from the mixture and the char becomes deactivated by accumulation thereon of $C_4$ and heavier hydrocarbons and their decomposition and polymerization products, it is desirable to attain a final char temperature of 1300°–1600° F., preferably about 1450°–1550° F., after contact of the char with the hot combustion gases.

For the reactivator desorption stages above that wherein char and combustion gases are first contacted, the desired temperature range is usually within the range of about 400° F. to 1100° F., depending on the reactivator pressure and the nature of the deactivants. This temperature range is usually attained without any special control by virtue of the counter-current heat exchange between the descending char and the ascending gases. However, it may be necessary or desirable in some cases to add additional heating to the upper stages or to cool some of these stages, for example, by the addition of liquid water.

In the oxidizing section, the amount and temperature of the steam entering the upper oxidizing stage is such that a temperature of approximately 1450° F. is obtained in the upper stage of the oxidizing section directly below the char heating stage. The hot char descending from the heating stage to the uppermost stage of the oxidizing section will drop 50° to 100° F. due to contact with the stream from the bottom stage at about 1160° F. and to the endothermic oxidizing reaction. In the lower stage of the oxidizing section the char loses further heat in contact with the steam which usually enters this stage as conveniently available process steam at a temperature of 250°–350° F. As previously related, it is preferred to combine the steam leaving the oxidizing section with the combustion gas ascending the char heating stage in the desorption section of the reactivator in order to increase the amount of stripping gas for the upper desorption section.

The reactivator operates preferably at about the same pressure as the adsorber in which the adsorptive fractionation of the hydrocarbon gases is being carried out, from the standpoint of char exchange between adsorption and reactivation systems. Pressures of approximately 0 to 600 p. s. i. g. and higher are perfectly operable for the reactivation. The lower the reactivator pressure, the less reactivation steam and combustion air compression is required.

The invention is readily adaptable to handling the adsorbent as a fluidized solid, for example, using particles of 100–200 mesh average size. In this case appropriate staging means within the reactivator are provided as previously related. The invention is also adaptable to handling coarser solid, for example 10–30 mesh average size particles, as a compact gravitating bed, which would require no staging means within the various reactivator sections. In this case appropriate gas and solids disengaging and engaging devices and mechanisms for feeding and withdrawing solids from the reactivator are provided. Initial contact of hot combustion gas with the coarser solid can also be effected in a lift line external to the reactivator.

Other modifications of the invention will become apparent. For example, if desired, vapor from one or more of the reactivator desorption stages may be recycled and combined with the initial hot combustion gas to reduce the temperature of the latter before its initial contact with the adsorbent. Also, in particular if readily desorbable constituents comprise the bulk of adsorbent deactivants, adsorbent sidestreams may be withdrawn from upper desorption stages and returned directly to the adsorber-desorber system, thus by-passing the reactivator heating and oxidation stages (see applicant's copending case, Serial No. 233,553, now Patent No. 2,758,099). Again, more than one heating stage may be used at different temperature levels and with direct combustion gas or indirect heating applied to each heating stage. As related previously, liquid water as well as process steam may be introduced to one or more stages in the oxidizing section, and liquid water may be injected into desorption stages for stage temperature control if desired.

In order to minimize the required amount of alloy steel and thermal strains on metals, the reactivator shell 1, line 5, and cone 6 are insulated internally. External insulation on equipment which is not otherwise insulated will serve to minimize heat loss from the reactivator system.

In summary, therefore, applicant's invention is concerned with a countercurrent char reactivation process in which the char is heated in an intermediate section by direct contact with combustion gas, contacted with pure concentrated steam in a lower section for controlled oxidation of heavy deactivants contained on the char, and stripping desorable material from the char in the upper section by the combined effects of steam and combustion gas during simultaneous heat exchange between gas and char, thus accomplishing the three necessary operations required in reactivation with maximum efficiency.

It is to be pointed out that the term "heating section" as used herein is used to designate the intermediate reactivator section to which hot combustion gas is added. It is to be realized of course that the char is also being heated gradually by countercurrent heat exchange with the reactivator gases in the desorption section.

Having thus described the invention, its patentable features are particularly pointed out in the appended claims.

What is claimed is:

1. Process for reactivating spent solid absorbent containing desorbable contaminants and nondesorbable high molecular weight polymeric and tar-like contaminants, which comprises providing a reactivation zone containing a desorbing section, a heating section, and an oxidizing section through which the spent adsorbent flows downwardly in successive order, introducing the spent adsorbent into the desorption section, contacting the spent adsorbent in the desorption section with ascending gas containing steam and carbon dioxide but substantially free of molecular oxygen and at temperatures in the range of 400° to 1100° F. to strip desorbable contaminants from the char and to heat the adsorbent gradually as it descends through said desorption section, said gas ascending from the heating section, contacting the adsorbent freed of desorbable contaminants in the heating section with hot combustion gas containing carbon dioxide and steam formed at a sufficiently elevated temperature to raise the temperature of the adsorbent to 1300° to 1600° F., passing the adsorbent heated to a temperature between 1300° and 1600° F. from the heating section into the oxidizing section, contacting the thus heated adsorbent descending in the oxidizing section countercurrently with relatively lower temperature process steam to effect controlled final oxidation of the nondesorbable contaminants on the adsorbent as the adsorbent loses heat in contact with the cooler steam, recovering reactivated adsorbent from the oxidizing section, and removing spent reactivating gases from the desorption section.

2. The process according to claim 1, in which heating of the adsorbent in the heating section is accomplished by removing adsorbent preheated in the desorption section from said desorption section to an external confined and elongated mixing zone, contacting the adsorbent in said mixing zone with hot combustion gases heated to a temperature sufficiently high to raise the temperature of the adsorbent in the range of about 1500° to 1575° F., then introducing the heated adsorbent with the combustion products into the heating section of the reactivation zone.

3. The process according to claim 1, in which the adsorbent heated to a temperature in the range of 1450° to 1550° F. in the heating section is contacted with cooler steam introduced into the oxidizing section at 250° to 350° F. so that the adsorbent becomes cooled to temperatures from about 1450 to about 1160° F. in descending through the oxidizing section.

4. The process according to claim 1 in which the solid adsorbent is activated carbon.

5. The process according to claim 1 in which the solid adsorbent is silica gel.

References Cited in the file of this patent

UNITED STATES PATENTS

| | | |
|---|---|---|
| 2,379,734 | Martin | July 3, 1945 |
| 2,509,745 | Riggs | May 30, 1950 |
| 2,520,983 | Wilcox | Sept. 5, 1950 |
| 2,526,881 | Kunreuther et al. | Oct. 24, 1950 |
| 2,571,380 | Penick | Oct. 16, 1951 |
| 2,616,858 | Gillette et al. | Nov. 4, 1952 |
| 2,660,262 | Nicholson | Nov. 24, 1953 |
| 2,684,731 | Starr et al. | July 27, 1954 |
| 2,692,656 | Berg | Oct. 26, 1954 |